(12) United States Patent
Brown Elliott (10) Patent No.: US 7,705,855 B2
(45) Date of Patent: Apr. 27, 2010

(54) BICHROMATIC DISPLAY

(75) Inventor: Candice Hellen Brown Elliott, Santa Rosa, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 673 days.

(21) Appl. No.: 11/424,539

(22) Filed: Jun. 15, 2006

(65) Prior Publication Data

US 2006/0284872 A1    Dec. 21, 2006

Related U.S. Application Data

(60) Provisional application No. 60/690,994, filed on Jun. 15, 2005.

(51) Int. Cl.
 *G09G 5/02* (2006.01)
 *G09G 3/36* (2006.01)
 *H04N 5/33* (2006.01)

(52) U.S. Cl. .................. 345/589; 345/88; 345/597; 345/598; 345/603; 345/694; 345/590; 348/162; 348/164

(58) Field of Classification Search ......... 345/597–598, 345/603, 694, 88
See application file for complete search history.

(56) References Cited

U.S. PATENT DOCUMENTS

| 3,806,633 | A | * | 4/1974 | Coleman ..................... 348/33 |
| 4,632,514 | A | | 12/1986 | Ogawa et al. |
| 4,642,619 | A | * | 2/1987 | Togashi ..................... 345/695 |
| 5,311,205 | A | | 5/1994 | Hamada et al. |
| 5,341,153 | A | | 8/1994 | Benzschawel et al. |
| 5,398,066 | A | | 3/1995 | Martinez-Uriegas et al. |
| 5,461,503 | A | | 10/1995 | Deffontaines et al. |

(Continued)

FOREIGN PATENT DOCUMENTS

JP    60-107022    6/1985

(Continued)

OTHER PUBLICATIONS

Peercy, Mark S. and Lambertus Hesselink, Dichromatic Color Representations for Complex Display Systems, 1993, IEEE Conference on Visualization Proceedings, pp. 212-219.*

(Continued)

*Primary Examiner*—Xiao M Wu
*Assistant Examiner*—Lillian K Ng
(74) *Attorney, Agent, or Firm*—Innovation Counsel LLP (57) ABSTRACT

A display system includes a subpixelated display panel having subpixels in two saturated primary colors. In one embodiment, the primary colors are selected so as to be a substantially metameric pair for an achromatic color such as white. Information display efficiencies arise from utilizing a checkerboard arrangement for the two primary colored subpixels and from using subpixel rendering algorithms to render an image on the display. The bichromatic display may display a black and white image combined with a monochromatic image, or may provide the capability to overlay a first image from a first image source carried on a chromatic channel onto a second image from a second image source carried on a luminance channel, where the first image source detects light wavelengths that the Human Vision System is not sensitive to, such as infrared light. This latter embodiment of the bichromatic display system is suitable for night vision devices.

19 Claims, 5 Drawing Sheets

U.S. PATENT DOCUMENTS

| | | | |
|---|---|---|---|
| 5,991,438 | A | 11/1999 | Shaked et al. |
| 6,072,445 | A | 6/2000 | Spitzer et al. |
| 6,137,560 | A | 10/2000 | Utsumi et al. |
| 6,278,434 | B1 | 8/2001 | Hill et al. |
| 6,360,023 | B1 | 3/2002 | Betrisey et al. |
| 6,385,466 | B1 | 5/2002 | Hirai et al. |
| 6,393,145 | B2 | 5/2002 | Betrisey et al. |
| 6,560,029 | B1 | 5/2003 | Dobbie et al. |
| 6,593,981 | B1 | 7/2003 | Haim et al. |
| 6,614,414 | B2 | 9/2003 | De Haan et al. |
| 6,636,185 | B1 | 10/2003 | Spitzer et al. |
| 6,738,526 | B1 | 5/2004 | Betrisey et al. |
| 6,842,207 | B2 | 1/2005 | Nishida et al. |
| 6,937,217 | B2 | 8/2005 | Klompenhouwer et al. |
| 2001/0048764 | A1 | 12/2001 | Betrisey et al. |
| 2002/0030780 | A1 | 3/2002 | Nishida et al. |
| 2002/0054263 | A1 | 5/2002 | Kim et al. |
| 2002/0113800 | A1* | 8/2002 | Jones et al. ............. 345/589 |
| 2002/0191009 | A1* | 12/2002 | Liang et al. ............. 345/694 |
| 2003/0085906 | A1* | 5/2003 | Elliott et al. ............. 345/613 |
| 2003/0218618 | A1* | 11/2003 | Phan ............. 345/629 |
| 2004/0004584 | A1 | 1/2004 | Hebert |
| 2004/0046725 | A1 | 3/2004 | Lee |
| 2004/0051724 | A1 | 3/2004 | Elliott et al. |
| 2004/0061710 | A1 | 4/2004 | Messing et al. |
| 2004/0080479 | A1 | 4/2004 | Credelle |
| 2004/0174389 | A1 | 9/2004 | Ben-David et al. |
| 2004/0239813 | A1 | 12/2004 | Klompenhouwer |
| 2004/0263528 | A1 | 12/2004 | Murdoch et al. |
| 2005/0007327 | A1 | 1/2005 | Elion et al. |
| 2005/0140573 | A1 | 6/2005 | Riser et al. |
| 2005/0225575 | A1 | 10/2005 | Brown Elliott et al. |
| 2006/0055713 | A1* | 3/2006 | Asao et al. ............. 345/690 |

FOREIGN PATENT DOCUMENTS

| | | |
|---|---|---|
| JP | 62 127716 | 6/1987 |
| JP | 11-014978 | 1/1999 |
| WO | WO 00/42762 | 7/2000 |
| WO | WO 00/70392 | 11/2000 |
| WO | WO 02/11112 A2 | 2/2002 |

OTHER PUBLICATIONS

Betrisey, C., et al., Displaced Filtering for Patterned Displays, SID Symp. Digest 1999, pp. 296-299.

Brown Elliott, C., "Active Matrix Display . . . ", IDMC 2000, 185-189, Aug. 2000.

Brown Elliot, C., "Adding a White Subpixel", Information Display May 2005, pp. 26-31.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the PenTile Matrix™ Color AMLCD Subpixel Architecture and Rendering Algorithms", SID 2003, Journal Article.

Brown Elliott, C., "High Pixel-Density Mobile Displays . . . ", SID 2006, pp. 1984-1986.

Brown Elliott, C, "New Pixel Layout for PenTile Matrix™ Architecture", IDMC 2002, pp. 115-117.

Brown Elliott, C, "Pentile Matirx™ Displays and Drivers" ADEAC Proceedings Paper, Portland OR., Oct. 2005.

Brown Elliott, C, "Reducing Pixel Count Without Reducing Image Quality", Information Display Dec. 1999, vol. 1, pp. 22-25.

Brown Elliott, C, "Visual Resolution vs Counting Dots", Veritas et Visus Newsletter, Nov. 2005, pp. 15-17.

Credelle, Thomas, "High-Pixel-Density PenTile Matrix RGBW Displays . . . ", IMID Digest Jul. 05, pp. 867-872.

Credelle, Thomas, "P-00: MTF of High-Resolution PenTile Matrix Displays", Eurodisplay 02 Digest, 2002 pp. 1-4.

Klompenhouwer, Michiel, Subpixel Image Scaling for Color Matrix Displays, SID Symp. Digest, May 2002, pp. 176-179.

Michiel A. Klompenhouwer, Gerard de Haan, Subpixel image scaling for color matrix displays, Journal of the Society for Information Display, vol. 11, Issue 1, Mar. 2003, pp. 99-108.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

Pollack, Joel, "Advances in Display Technology", Portable Design, Jun. 2006, pp. 19-21.

Pollack, Joel, "A Balance of Power" Electronic Design, Jun. 12, 2006, ED Online ID #11696,www.elecdesign.com.

Pollack, Joel, "Subpixel Rendering for High-Res Mobile Displays", Jan. 13, 2005, ED Online ID #9386 www.elecdesign.com.

Yoon, Hyeun Joong, "Development of the RGBW TFT-LCD with Data Rendering . . . ", SID Digest, May 2005 pp. 244-247.

European Search Report, EP6770785.1-2205, Nov. 4, 2009, 9 pages.

* cited by examiner

BICHROMATIC DISPLAY

This application claims the benefit of U.S. Provisional Application 60/690,994 filed on Jun. 15, 2005, which is hereby incorporated by reference herein for all purposes.

FIELD OF INVENTION

The present application is related to image display systems, and more particularly, to subpixel repeating groups (layouts and arrangements) and subpixel rendering techniques suitable for a subpixelated display system having two saturated primary colors, and which is suitable for processing image data from both visible and non-visible (e.g., infrared) light or image sources.

BACKGROUND

Novel sub-pixel arrangements are disclosed for improving the cost/performance curves for image display devices in the following commonly owned U.S. patents and patent applications including: (1) U.S. Pat. No. 6,903,754 ("the '754 Patent") entitled "ARRANGEMENT OF COLOR PIXELS FOR FULL COLOR IMAGING DEVICES WITH SIMPLIFIED ADDRESSING;" (2) United States Patent Publication No. 2003/0128225 ("the '225 application") having application Ser. No. 10/278,353 and entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Patent Publication No. 2003/0128179 ("the '179 application") having application Ser. No. 10/278,352 and entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) United States Patent Publication No. 2004/0051724 ("the '724 application") having application Ser. No. 10/243,094 and entitled "IMPROVED FOUR COLOR ARRANGEMENTS AND EMITTERS FOR SUB-PIXEL RENDERING," filed Sep. 13, 2002; (5) United States Patent Publication No. 2003/0117423 ("the '423 application") having application Ser. No. 10/278,328 and entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Patent Publication No. 2003/0090581 ("the '581 application") having application Ser. No. 10/278,393 and entitled "COLOR DISPLAY HAVING HORIZONTAL SUB-PIXEL ARRANGEMENTS AND LAYOUTS," filed Oct. 22, 2002; and (7) United States Patent Publication No. 2004/0080479 ("the '479 application") having application Ser. No. 10/347,001 and entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003. Each of the aforementioned '225, '179, '724, '423, '581, and '479 published applications and U.S. Pat. No. 6,903,754 are hereby incorporated by reference herein in its entirety.

For certain subpixel repeating groups having an even number of subpixels in a horizontal direction, systems and techniques to affect improvements, e.g. polarity inversion schemes and other improvements, are disclosed in the following commonly owned U.S. patent documents: (1) United States Patent Publication No. 2004/0246280 ("the '280 application") having application Ser. No. 10/456,839 and entitled "IMAGE DEGRADATION CORRECTION IN NOVEL LIQUID CRYSTAL DISPLAYS"; (2) United States Patent Publication No. 2004/0246213 ("the '213 application") (U.S. patent application Ser. No. 10/455,925) entitled "DISPLAY PANEL HAVING CROSSOVER CONNECTIONS EFFECTING DOT INVERSION"; (3) United States Patent Publication No. 2004/0246381 ("the '381 application") having application Ser. No. 10/455,931 and entitled "SYSTEM AND METHOD OF PERFORMING DOT INVERSION WITH STANDARD DRIVERS AND BACKPLANE ON NOVEL DISPLAY PANEL LAYOUTS"; (4) United States Patent Publication No. 2004/0246278 ("the '278 application") having application Ser. No. 10/455,927 and entitled "SYSTEM AND METHOD FOR COMPENSATING FOR VISUAL EFFECTS UPON PANELS HAVING FIXED PATTERN NOISE WITH REDUCED QUANTIZATION ERROR"; (5) United States Patent Publication No. 2004/0246279 ("the '279 application") having application Ser. No. 10/456,806 entitled "DOT INVERSION ON NOVEL DISPLAY PANEL LAYOUTS WITH EXTRA DRIVERS"; (6) United States Patent Publication No. 2004/0246404 ("the '404 application") having application Ser. No. 10/456,838 and entitled "LIQUID CRYSTAL DISPLAY BACKPLANE LAYOUTS AND ADDRESSING FOR NON-STANDARD SUBPIXEL ARRANGEMENTS"; (7) United States Patent Publication No. 2005/0083277 ("the '277 application") having application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) United States Patent Publication No. 2005/0212741 ("the '741 application") having application Ser. No. 10/807,604 and entitled "IMPROVED TRANSISTOR BACKPLANES FOR LIQUID CRYSTAL DISPLAYS COMPRISING DIFFERENT SIZED SUBPIXELS", filed Mar. 23, 2004. Each of the aforementioned '280, '213, '381, '278, '404, '277 and '741 published applications are hereby incorporated by reference herein in its entirety.

These improvements are particularly pronounced when coupled with sub-pixel rendering (SPR) systems and methods further disclosed in the above-referenced U.S. patent documents and in commonly owned U.S. patents and patent applications: (1) United States Patent Publication No. 2003/0034992 ("the '992 application") having application Ser. No. 10/051,612 and entitled "CONVERSION OF A SUB-PIXEL FORMAT DATA TO ANOTHER SUB-PIXEL DATA FORMAT," filed Jan. 16, 2002; (2) United States Patent Publication No. 2003/0103058 ("the '058 application") having application Ser. No. 10/150,355 entitled "METHODS AND SYSTEMS FOR SUB-PIXEL RENDERING WITH GAMMA ADJUSTMENT," filed May 17, 2002; (3) United States Patent Publication No. 2003/0085906 ("the '906 application") having application Ser. No. 10/215,843 and entitled "METHODS AND SYSTEMS FOR SUB-PIXEL RENDERING WITH ADAPTIVE FILTERING," filed Aug. 8, 2002; (4) United States Publication No. 2004/0196302 ("the '302 application") having application Ser. No. 10/379,767 and entitled "SYSTEMS AND METHODS FOR TEMPORAL SUB-PIXEL RENDERING OF IMAGE DATA" filed Mar. 4, 2003; (5) United States Patent Publication No. 2004/0174380 ("the '380 application") having application Ser. No. 10/379,765 and entitled "SYSTEMS AND METHODS FOR MOTION ADAPTIVE FILTERING," filed Mar. 4, 2003; (6) U.S. Pat. No. 6,917,368 ("the '368 Patent") entitled "SUB-PIXEL RENDERING SYSTEM AND METHOD FOR IMPROVED DISPLAY VIEWING ANGLES"; and (7) United States Patent Publication No. 2004/0196297 ("the '297 application") having application Ser. No. 10/409,413 and entitled "IMAGE DATA SET WITH EMBEDDED PRE-SUBPIXEL RENDERED IMAGE" filed Apr. 7, 2003. Each of the aforementioned '992, '058, '906, '302, 380 and '297 applications and the '368 patent are hereby incorporated by reference herein in its entirety.

Improvements in gamut conversion and mapping are disclosed in commonly owned U.S. patents and co-pending U.S. patent applications: (1) U.S. Pat. No. 6,980,219 ("the '219 Patent") entitled "HUE ANGLE CALCULATION SYSTEM AND METHODS"; (2) United States Patent Publication No. 2005/0083341 ("the '341 application") having application Ser. No. 10/691,377 and entitled "METHOD AND APPARATUS FOR CONVERTING FROM SOURCE COLOR SPACE TO TARGET COLOR SPACE", filed Oct. 21, 2003; (3) United States Patent Publication No. 2005/0083352 ("the '352 application") having application Ser. No. 10/691,396 and entitled "METHOD AND APPARATUS FOR CONVERTING FROM A SOURCE COLOR SPACE TO A TARGET COLOR SPACE", filed Oct. 21, 2003; and (4) United States Patent Publication No. 2005/0083344 ("the '344 application") having application Ser. No. 10/690,716 and entitled "GAMUT CONVERSION SYSTEM AND METHODS" filed Oct. 21, 2003. Each of the aforementioned '341, '352 and '344 applications and the '219 patent is hereby incorporated by reference herein in its entirety.

Additional advantages have been described in (1) United States Patent Publication No. 2005/0099540 ("the '540 application") having application Ser. No. 10/696,235 and entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; and in (2) United States Patent Publication No. 2005/0088385 ("the '385 application") having application Ser. No. 10/696,026 and entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003, each of which is hereby incorporated herein by reference in its entirety.

Additionally, each of these co-owned and co-pending applications is herein incorporated by reference in its entirety: (1) United States Patent Publication No. 2005/0225548 ("the '548 application") having application Ser. No. 10/821,387 and entitled "SYSTEM AND METHOD FOR IMPROVING SUB-PIXEL RENDERING OF IMAGE DATA IN NON-STRIPED DISPLAY SYSTEMS"; (2) United States Patent Publication No. 2005/0225561 ("the '561 application") having application Ser. No. 10/821,386 and entitled "SYSTEMS AND METHODS FOR SELECTING A WHITE POINT FOR IMAGE DISPLAYS"; (3) United States Patent Publication No. 2005/0225574 ("the '574 application") and United States Patent Publication No. 2005/0225575 ("the '575 application") having application Ser. Nos. 10/821,353 and 10/961,506 respectively, and both entitled "NOVEL SUBPIXEL LAYOUTS AND ARRANGEMENTS FOR HIGH BRIGHTNESS DISPLAYS"; (4) United States Patent Publication No. 2005/0225562 ("the '562 application") having application Ser. No. 10/821,306 and entitled "SYSTEMS AND METHODS FOR IMPROVED GAMUT MAPPING FROM ONE IMAGE DATA SET TO ANOTHER"; (5) United States Patent Publication No. 2005/0225563 ("the '563 application") having application Ser. No. 10/821,388 and entitled "IMPROVED SUBPIXEL RENDERING FILTERS FOR HIGH BRIGHTNESS SUBPIXEL LAYOUTS"; and (6) United States Patent Publication No. 2005/0276502 ("the '502 application") having application Ser. No. 10/866,447 and entitled "INCREASING GAMMA ACCURACY IN QUANTIZED DISPLAY SYSTEMS."

Additional improvements to, and embodiments of, display systems and methods of operation thereof are described in: (1) Patent Cooperation Treaty (PCT) Application No. PCT/US 06/12768, entitled "EFFICIENT MEMORY STRUCTURE FOR DISPLAY SYSTEM WITH NOVEL SUB-PIXEL STRUCTURES" filed Apr. 4, 2006, and published in the United States as United States Patent Application Publication 2008/0170083 (2) Patent Cooperation Treaty (PCT) Application No. PCT/US 06/12766, entitled "SYSTEMS AND METHODS FOR IMPLEMENTING LOW-COST GAMUT MAPPING ALGORITHMS" filed Apr. 4, 2006, and published in the United States as United States Patent Application Publication 2008/0150958; (3) U.S. patent application Ser. No. 11/278,675, entitled "SYSTEMS AND METHODS FOR IMPLEMENTING IMPROVED GAMUT MAPPING ALGORITHMS" filed Apr. 4, 2006, and published as United States Patent Application Publication 2006/0244686 (4) Patent Cooperation Treaty (PCT) Application No. PCT/US 06/12521, entitled "PRE-SUBPIXEL RENDERED IMAGE PROCESSING IN DISPLAY SYSTEMS" filed Apr. 4, 2006, and published in the United States as United States Patent Application Publication 2008/0186325 and (5) Patent Cooperation Treaty (PCT) Application No. PCT/US 06/19657 entitled "MULTIPRIMARY COLOR SUBPIXEL RENDERING WITH METAMERIC FILTERING" filed on May 19, 2006 and published in the United States as United States Patent Application Publication 2009/0058873 (hereafter referred to as the "Metamer Filtering application".) Each of these co-owned applications is also herein incorporated by reference in their entirety.

BRIEF DESCRIPTION OF THE DRAWINGS

The organization and methods of operation of the display systems and techniques disclosed herein are best understood from the following description of several illustrated embodiments when read in connection with the following drawings in which the same reference numbers are used throughout the drawings to refer to the same or like parts.

DETAILED DESCRIPTION

In the discussion that follows, a display system includes a display panel on which color images are formed by combining the individual colors disposed in an arrangement, or layout, referred to as a subpixel repeating group. The display system may form colors by using a color filter substrate on which the subpixel repeating group is disposed, or by arranging an array of addressable light emitters according to the subpixel repeating group, or in any other suitable manner.

When a subpixel repeating group is repeated across a display panel to form a device with the desired matrix resolution, the display panel is said to be substantially comprised of the subpixel repeating group because it is understood that size and/or manufacturing factors or constraints of the display panel may result in panels in which the subpixel repeating group is incomplete at one or more of the panel edges. The term "primary color" refers to each of the colors that occur in the subpixel repeating group. By way of example, the portion 700 of a display panel in FIG. 7 substantially comprising subpixel repeating group 730 of red and green (RG) colors disposed in vertical columns, or stripes, has two primary colors of red and green, while a display panel substantially comprising subpixel repeating group 330 of FIG. 3 including red subpixels 310, cyan subpixels 320 and white subpixels 315 is considered to have three primary colors of red, cyan and white (RCW), where the white (i.e., clear, with no color filter) subpixel represents a primary color. Note that in the figures showing subpixel repeating groups or portions of display panels showing subpixel layouts, the hatching lines used to represent the subpixel colors are used consistently across all figures.

Figure 7:
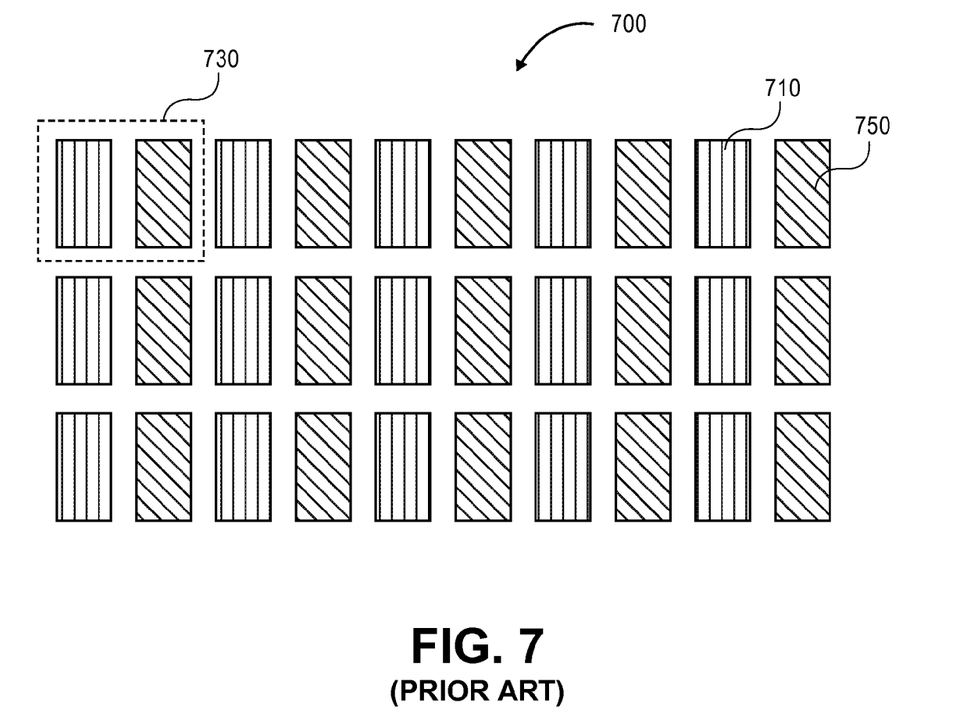
FIG. 7 shows a section of a prior art display panel comprised of a bichromatic primary pair having subpixels arranged in vertical stripes.

There exist some applications for which a bichromatic primary display would suffice or be preferable. For example, simple monochromatic text or icons of one color that are distinguishable from monochromatic text or icons of another color are used in industrial controllers where, for example, green may denote normal status, yellow may denote a caution status, and red may denote an urgent status. Such bichromatic displays using substantially red and green primary colors showing a range of green to yellow to red colors are known in the prior art. FIG. 7 shows a portion of a display panel 700 having subpixel repeating group 730 consisting of pairs of red subpixels 710 and green subpixels 750 arranged in stripes on display 700. The following discussion presents embodiments of bichromatic displays alternative to the bichromatic display of FIG. 7.

Embodiment of a Display System

Figure 3:
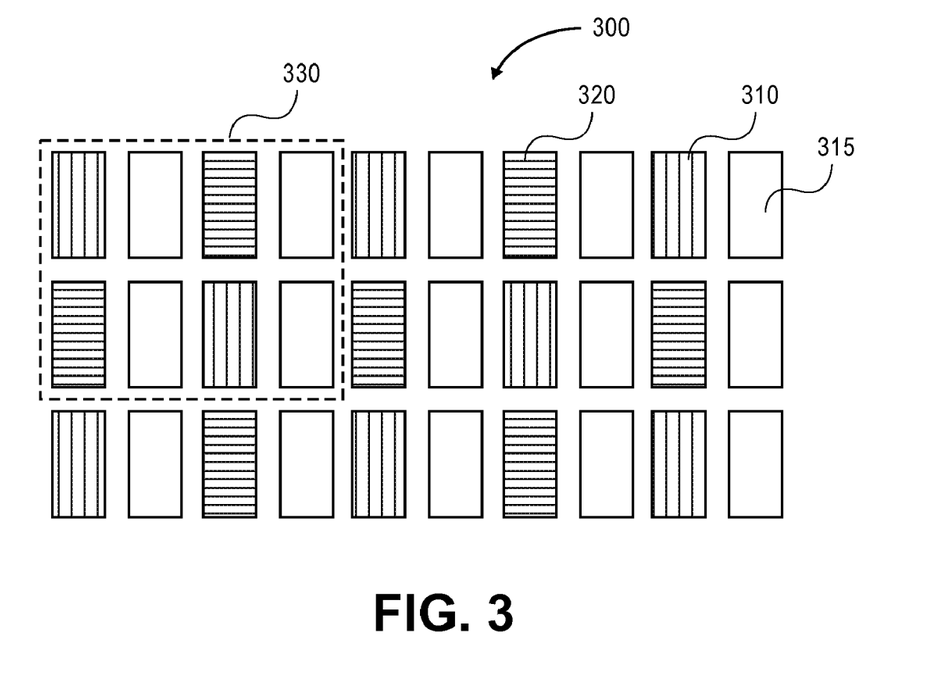
FIG. 3 shows a section of a display panel substantially comprising an eight subpixel repeating group comprising three primary colors, in which each subpixel is substantially twice as tall as it is wide.
Figure 4:
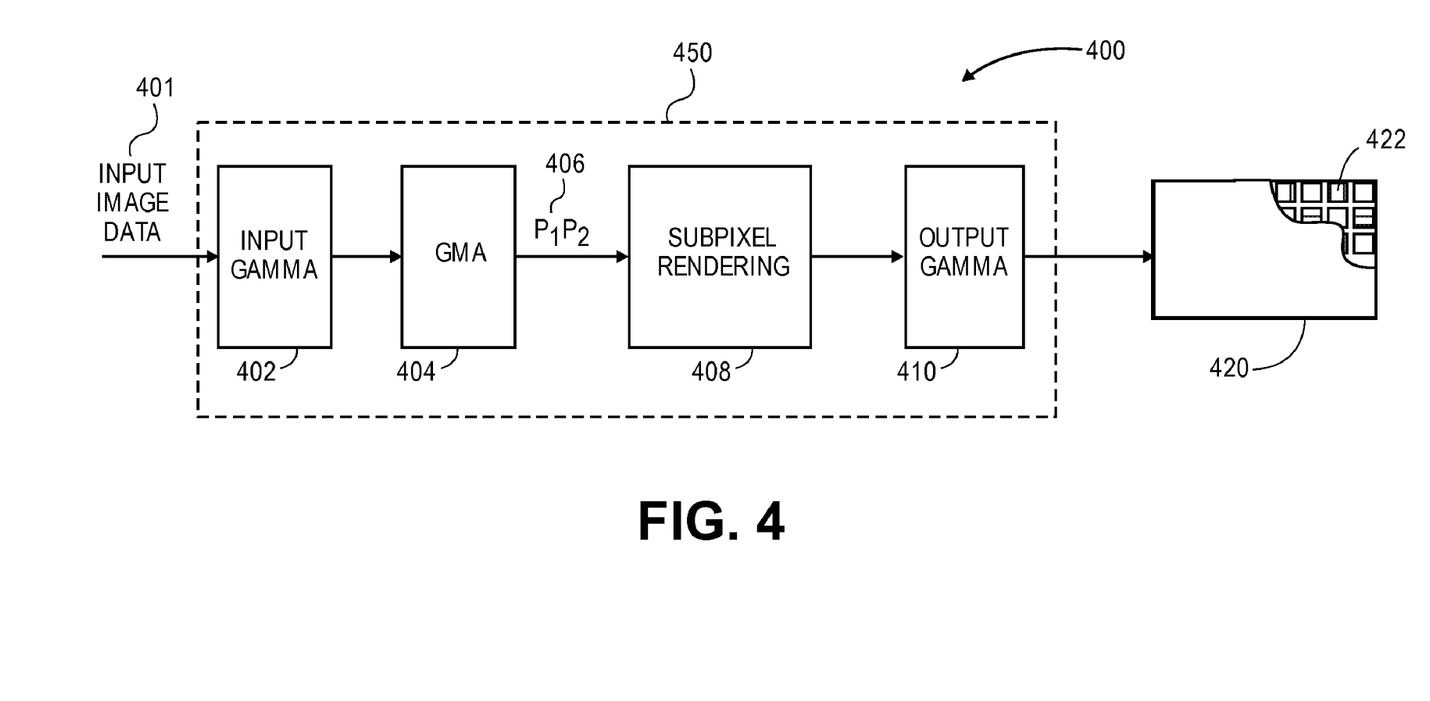
FIG. 4 is a block diagram of one embodiment of a display system having a bichromatic display.

FIG. 4 is a block diagram of an exemplary bichromatic display system 400 having a spatial light modulator panel 420 for producing images. Bichromatic display system 400 is suitable for use in any device of any size requiring a display. Panel 420 is a subpixelated display panel substantially comprising a subpixel repeating group 422 as shown, for example in any one of FIGS. 2, 3 and 5. Spatial light modulator panel 420 may be implemented as a color flat panel display of any type, such as a liquid crystal display (LCD) panel, an Organic Light Emitting Display (OLED), Plasma Display Panel (PDP), or a Rear Projection Television (RPTV) and the like.

Primary Color Selection

The selection of the primary colors for panel 420 may follow some basic guidelines. In one embodiment, panel 420 may comprise an arrangement of two subpixels, the colors of which form a substantially metameric pair for an achromatic color, such as the color white. There are often multiple combinations of values for a given set of primary colors that may give the same color value. That is to say, for a given hue, saturation, and brightness, there may be more than one set of intensity values of the color primaries that may give the same color impression to a human viewer, or that produce a color perception that may be substantially undistinguishable by the human eye when viewed at normal operating distances. Each such possible intensity value set is called a "metamer" for said color. Thus, a metamer on a subpixelated display is a combination (or a set) of at least two groups of colored subpixels such that there exist signals that, when applied to each such group, yields a desired color that is perceived by the human vision system. Such a signal may vary according to the group of subpixels, in order to produce the same or substantially similar perceived color. The two primary colors of the subpixels of panel 420, then, are selected such that they produce a substantially achromatic color, such as the color white, when combined.

Figure 1:
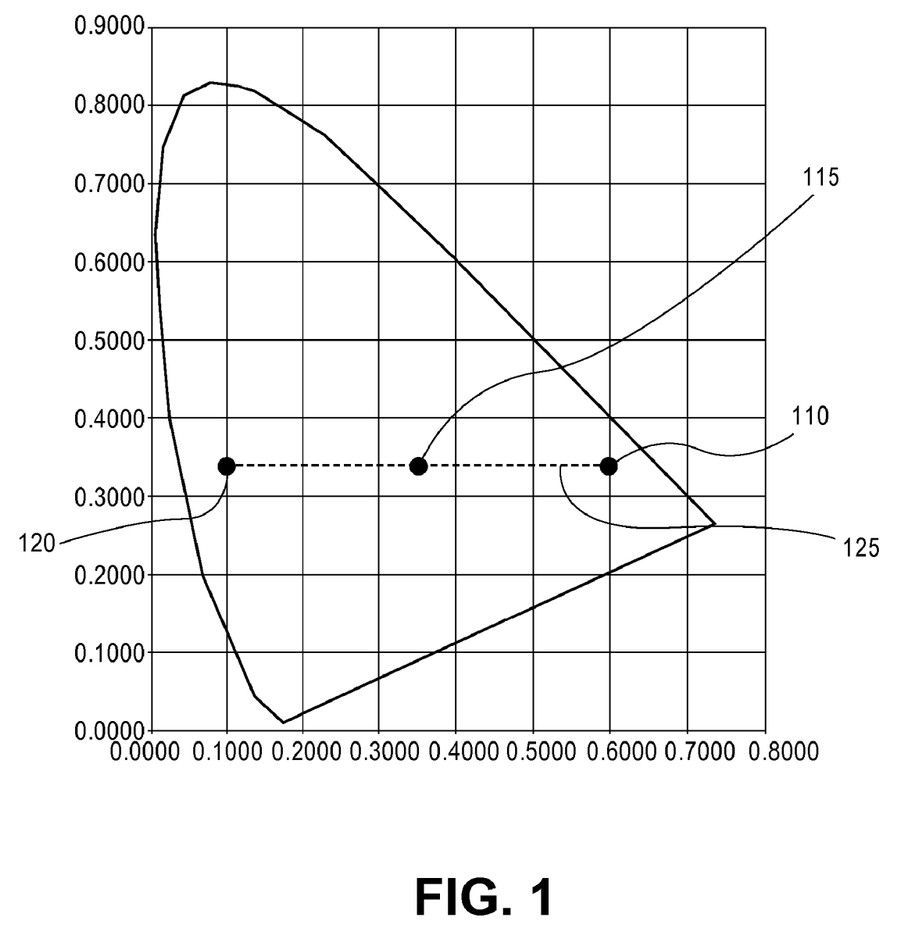
FIG. 1 shows the 1931 CIE color space diagram illustrating an example of two saturated primary colors forming a metamer for the color white.

FIG. 1 illustrates the well known 1931 CIE chromaticity diagram with an example of a metameric color pair for white. In particular, FIG. 1 illustrates the metameric pair of red 110 and cyan 120. By drawing a line 125 between the metameric pair of red 110 and cyan 120, one can see that an achromatic color point, white 115, may be obtained by a mixture of the two primary color points red 110 and cyan 120. By varying the brightness of one or both of the two color primaries (red 110 and cyan 120), any color along line 125 may be created and displayed on panel 420 configured with a subpixel repeating group having red and cyan colored subpixels.

Any substantially metameric pair of colors may be chosen as primary colors for panel 420. For example, the metameric pair of orange and bluish-cyan may be substituted for the red 110 and cyan 120 primary colors shown in FIG. 1. Examples of other suitable metamaric primary color pairs, though not shown in the figures herein, include green and magenta, yellow and blue, violet and yellow-green and pink and pastel-cyan, all of which produce a substantially achromatic color, such as the color white, when combined.

While it may seemingly appear to be a small change, replacing the green subpixel 750 in the prior art bichromatic primary display 700 of FIG. 7 with cyan subpixel 120 as a primary color of the display, along with the red subpixel 110, may be used to some advantage. In this particular embodiment, the metameric pair of substantially red 110 and substantially cyan 120 primary colors has the property of being substantially the same luminance, which produces a brighter image and is useful for the subpixel rendering operation (discussed further below). It further has the property that it exhibits modulation that crosses both the red/green and yellow/blue Human Vision system chroma channel axis such that individuals with anomalous color vision (so called "color blindness") in one or the other visual channel may still perceive changes in the primary color.

Subpixel Arrangement of Primary Colors

With substantially metameric pairs of primary colors such as shown in FIG. 1, it is possible to create subpixelated displays that may have higher information efficiencies. These efficiencies may be achieved, for example, in the choice of subpixel arrangement of the primary colors.

Figure 2:
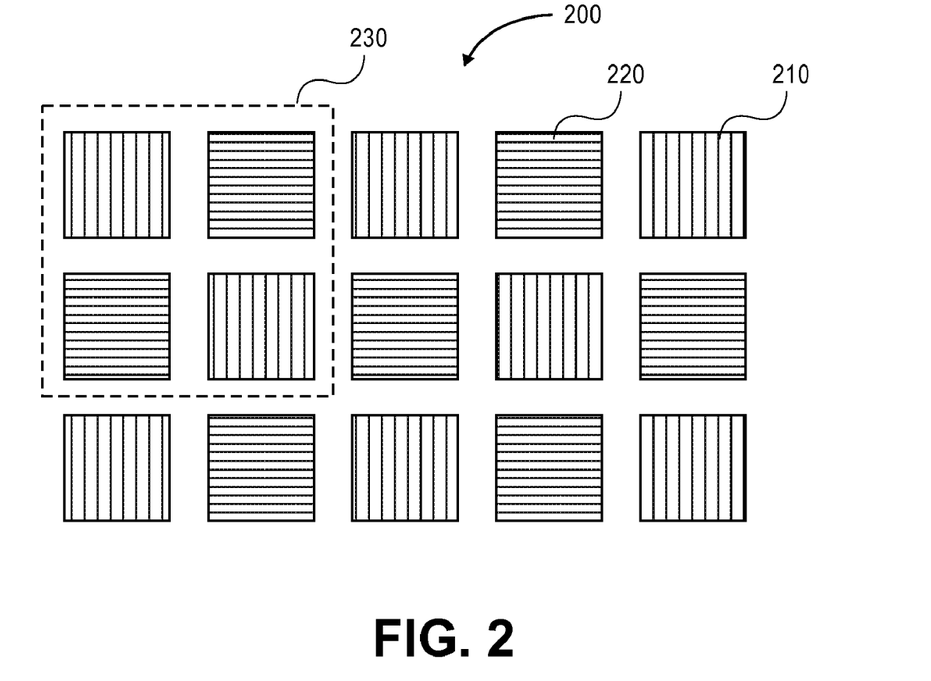
FIG. 2 shows a section of a display panel substantially comprising four subpixel repeating group having two saturated primary colors arranged in a checkerboard.

FIG. 2 illustrates a portion of a display panel 200 having a four subpixel repeating group 230 consisting of pairs of substantially red 210 and substantially cyan 220 subpixels arranged in a checkerboard on display 200. Reference is made to the primary colors as being "substantially" red or "substantially" cyan to account for variations in the wavelength of the light emitted or produced on the display by each respective primary color subpixel. For example, a "cyan" light emitter may have a peak at 505 nm but it is understood that the display systems discussed herein do not require the selected primary color of cyan to produce light at exactly 505 nm. In the embodiment of FIG. 2, this checkerboard arrangement may allow for "one-subpixel-per-pixel" addressability and Modulation Transfer Function Limit (MTFL) because an achromatic (white) line may be formed from a single column or row of subpixels. As noted above, it will be appreciated that any pair of primary colors that combine to produce a substantial metamer for white may suffice for such a checkerboard layout. While subpixel repeating group 230 shows subpixels 220 and 210 having the same size and a square shape, it will be appreciated that subpixels of other sizes and shapes are also suitable for the subpixelated display systems described herein.

Gamut Mapping Pipeline in Bichromatic Displays

With reference again to FIG. 4, display system 400 illustrates the data path 450, also referred to as the gamut mapping pipeline, for input image data 401. Input image data 401 may be similar to the conventional data set representing image data in three color primary colors (e.g., RUB), except that only two color primary values are coincidentally sampled. For example, when subpixel repeating group 422 of display panel 420 is substantially comprised of subpixel repeating group 230 of FIG. 2, input image data 401 may be specified as red and cyan (RC) image data. Data path 450 includes input gamma (linearization) module 402 and gamut mapping (GMA) function module 404 which produces an intermediate image data set 406 with color values specified in the primary colors (color space) of display panel 420, denoted in FIG. 4 as $P_1P_2$. In display systems described in various ones of the co-owned applications noted and incorporated by reference above, the GMA function transforms input color data specified in RGB primaries to a multi-primary target color space, such as, for example, RGBW. The output of the GMA function is a set of input image color values in RGBW color space, with a luminance, L, component identified. For information about the operation of gamut mapping functions in general, see, for example, US Published Patent Applications 2005/0083352, 2005/0083341, 2005/0083344 and 2005/0225562. These gamut mapping algorithms may be modified as needed to map input image data 401 from the color space specified by input color primaries to the appropriate output color space of the display.

With continued reference to data path 450 of FIG. 4, the set of gamut-mapped input image color values 406 produced by GMA function 404 is then input to subpixel rendering (SPR) module 408. For general information about the operation of SPR function 408, see, for example, US Published Patent Applications 2003/0034992, 2003/0103058, 2003/0085906, 2005/0225548 and 2005/0225563. The subpixel rendering algorithms described in these publications are modified as needed to accommodate a display system having two saturated primary colors. For example, when display panel 420 substantially comprises subpixel repeating group 230 of FIG. 2, the following subpixel rendering filters may be used to render onto display panel 420:

$$\begin{pmatrix} -z/4 & 0 & -z/4 \\ 0 & z & 0 \\ -z/4 & 0 & -z/4 \end{pmatrix} + \begin{pmatrix} 0 & .125 & 0 \\ .125 & .5 & .125 \\ 0 & .125 & 0 \end{pmatrix} \quad \text{Matrices 1 and 2}$$
$$\text{DOG Wavelet} + \text{Area Resample}$$

Each filter kernel represents coefficients in an equation; the positions of the coefficients in the table represent the relative positions of the input pixels being resampled to the subpixel reconstructing them. The coefficients are multiplied by the value of the input pixel, then summed and used as the value of the reconstruction subpixel. The Area Resample filter kernel samples the self-color plane while the Difference of Gaussians (DOG) Wavelet may sample the cross-color plane or another suitable data plane such as a luminance plane. This luminance plane may be calculated from the input RC values or may be supplied by the original image source. The value of "z" may be adjusted as desired to control the sharpness of the image by adjusting the Modulation Transfer Function (MTF) of the combined filter. By setting the value of "z" to 0.25, the MTF of the filter will be unity, or one (1.0), across all spatial frequencies up to the Nyquist Limit in the horizontal and vertical axes.

The output color image data from SPR module 408 then proceeds to output inverse gamma module 410 in preparation for display on panel 420.

Examples of Bichromatic Displays

In a first example, the bichromatic primary display systems described herein provide the capability to show an achromatic image combined with a monochromatic image. For example, it may be desirable to display an achromatic image, such as from a so-called "black and white" video source, while allowing monochromatic text or icons of a distinguishable color to be overlaid on the achromatic image.

Consider an exemplary bichromatic display in which the input image data is specified in two channels referred to as a luminance channel, specified as Y, and a single chromatic channel, specified as C or Cr. The input image data representing the achromatic image is represented in the Y channel, and the input image data representing the monochromatic text or icons of a distinguishable color is represented in the C channel. Display system 400 of FIG. 4 receives the YC (or YCr) input image data, and processes this data through the gamut mapping pipeline 450 which includes gamut mapping operation 404 which includes a suitable algorithm that converts the luminance and chrominance components into a bichromatic color space. One such algorithm is analogous to the algorithm that handles the conversion of the well known YCrCb color space values to RGB color space values. In the case of a bichromatic display, such as, for example, the Red-Cyan (RC) color space of display 200 of FIG. 2, the color space conversion may be denoted as YCr to RC. The conventional algorithm for handling YCrCb color space values to RGB color space values may be modified to produce R=Y+Cr and C=Y−Cr. Subpixel rendering operation 408 then renders the converted image data for display on the appropriate subpixelated display panel.

In a second example, the bichromatic primary display systems described herein provide the capability to overlay a first image from a first image source carried on a chromatic channel onto a second image from a second image source carried on a luminance channel, where the first image source detects wavelengths of light that the Human Vision System is not sensitive to. For example, it may be useful to display (reconstruct) video images from a camera sensitive to the wavelengths of light that are substantially the same as the Human Vision System is sensitive to, while overlaying (reconstructing) at the same time an image from a video camera sensitive to wavelengths to which the Human Vision System is not sensitive to, such as infrared wavelengths. One such potential use of this category of bichromatic displays may be in the field of night vision systems or devices (NVD). In this implementation, input image data may be captured as two coincident color values, placing a visible wavelength image on the luminance channel, Y, and an infrared image on the chrominance channel(s), C, Cr or CrCb.

Figure 8:
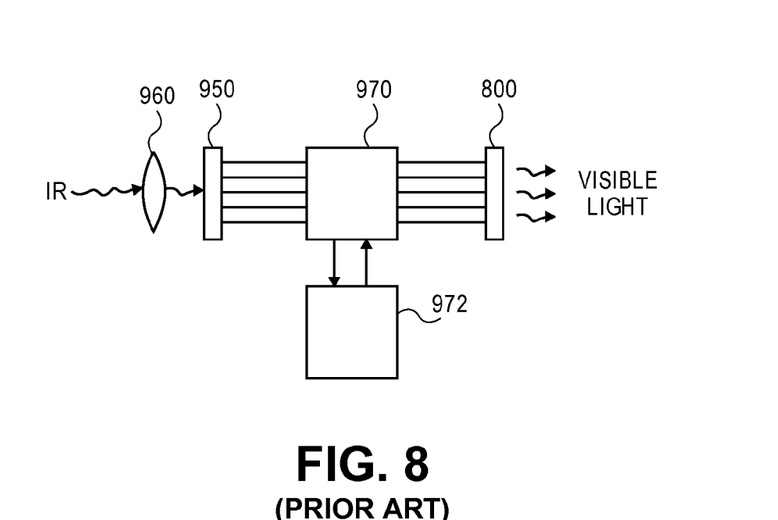
FIG. 8 is a block diagram of a prior art display system that functions as an infrared (IR) image converter, an image enhancing device and a display.

U.S. Pat. No. 6,636,185 illustrates an example of a display system that functions both as an infrared (IR) image converter, an image enhancing device and a display. The converter is useful for night vision devices, as well as for digital processing of IR and visible video data. As illustrated in FIG. 8, the converter consists of three main elements: IR detector array 950, multiplexing electronics 970, and light emitting diode (LED) array 800. The pixel data from the detectors is processed by electronics 970, which drives a synchronous multiplexed LED array 800. The processor can accept external data via data port 972 to add to or subtract from the image. In this way, image enhancement can be accomplished, or communications or other data can be superimposed on display 800. U.S. Pat. No. 6,636,185 is hereby incorporated by reference herein for all that it teaches.

U.S. Pat. No. 6,560,029 entitled "Video Enhanced Night Vision Goggle" discloses a portable video enhanced night vision goggle comprised of a head mount assembly, an image intensified video camera, and a display. A thermal camera may also be provided and the images from the video camera and the thermal camera may be electronically fused on the display. When head mounted and in operation, the video goggle is a monocular system and presents the intensified video image to one eye of the user, the other, "unaided" eye is also directed at the scene in front of the user. The display presents the intensified image such that it appears to overlay the image perceived by the user's unaided eye. The thermal camera is designed to provide a thermal video field of view that is essentially the same as the field of view of the intensified image camera. Two light wavelength bands which may be used are the 400-nm to 900-nm band (for the image intensifier) and the 8 µm to 12-µm band (for the thermal camera). A primary goal of an embodiment which incorporates both an image intensified video camera and a thermal camera is to take the images from sensor types and present their "fused" image to the user, so that the viewer sees the two images superimposed on each other. Unprocessed video camera and thermal camera video signals are fed to an image processing block having fusion capability. The image fusion function electronically overlays the two video images, adjusts their relative brightnesses, and may also add color cueing information. U.S. Pat. No. 6,560,029 is hereby incorporated by reference herein for all that it teaches.

Examples of other published references that discuss head-mounted display systems include U.S. 2004/0004584 entitled "Head-Mounted Viewing System for Single Electronic Displays Using Binocular Lens with Binocular Folding Mirrors" and US 2005/0140573 entitled "Image Display System and Method for Head-Supported Viewing System," both of which are hereby incorporated by reference herein.

Figure 6:
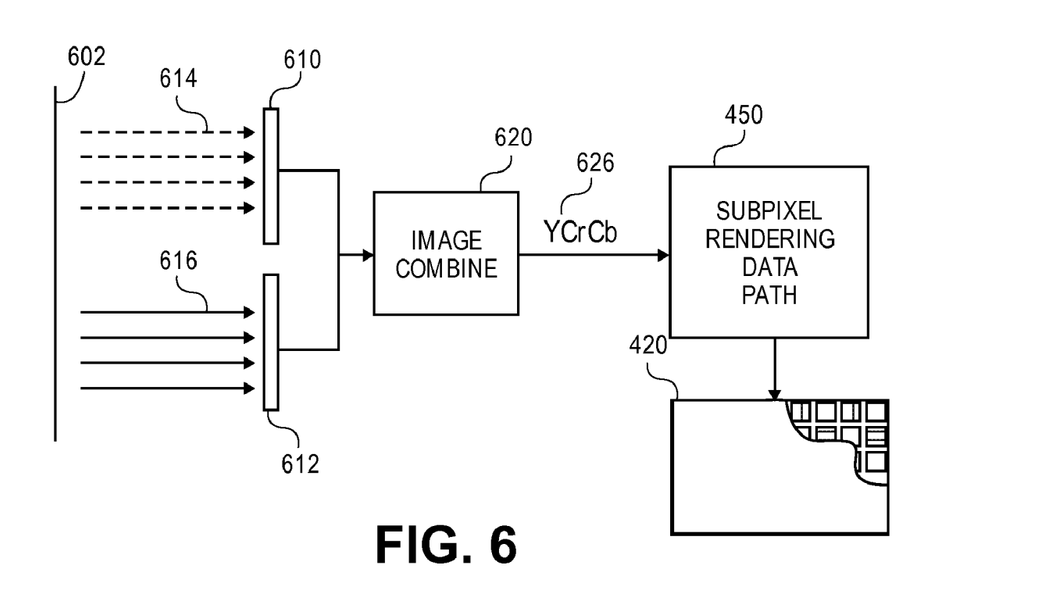
FIG. 6 is a block diagram of another embodiment of a display system having a bichromatic display and that processes infrared image data and visible image data detected from a scene.

FIG. 6 illustrates an embodiment of a bichromatic display system that processes infrared image data and visible image data detected from a scene 602. Infrared light wavelengths 614 are detected by IR detector 610 and visible light wavelengths 616 are detected by detector 612. Detectors 610 and 616 may be combined in one device, or may be separate detectors. Image combine module 620, which may be implemented in either hardware or software or a combination, combines the image data produced by each detector into a suitable image data format, such as, for example, YCrCb image data 626 or the YCr image data described above, using image processing methods and techniques known in the art. This combined input image data is then input to data path 450 of FIG. 4 for rendering on display 420, as described above.

Bichromatic Display Using a White Primary

In another embodiment of the bichromatic display system disclosed herein, it may be desirable to include in the subpixel repeating group of display panel 420 (FIG. 4), a substantially achromatic (non-saturated) primary color such as white. In a transmissive system, such as is common in Liquid Crystal Displays (LCD), this primary may be a clear, filterless subpixel. The presence of this clear subpixel increases the total transmissivity of the display panel, allowing for greater display brightness at a given power level, or allowing for reducing the power required to achieve a specified brightness. FIG. 3 illustrates a portion of display panel 300 substantially comprising eight subpixel repeating group 330 having red subpixels 310 and cyan subpixels 320 on a checkerboard with an additional white, or clear, subpixel 315 added in a vertical row configuration to form a brighter or lower power display. It will be appreciated that the white subpixels may have the same area as the colored subpixels or may have a smaller area. Additionally, all subpixels in either FIG. 2, 3, or 5 may have a number of different aspect ratios—e.g. 1×1, 1×2, 2×3, 1×3—or geometries. These different aspect ratios and geometries may provide additional improved efficiencies or affect image quality, but it is understood that it may suffice that the substantially metameric pairs are formed on a checkerboard pattern.

Using subpixel repeating group 330 of FIG. 3 would require the conversion from the YCr or from the RC color space of the input color image data to the RCW color space of the output display. Such a conversion may be determined in a manner analogous to techniques and methods disclosed in the above-referenced and co-owned applications that discuss color space conversions, such as US Published Patent Applications 2005/0083352, 2005/0083341, 2005/0083344 and 2005/0225562, some of which specifically discuss color space conversion from RGB to RGBW color space. The subpixel rendering operation is also analogous to that found in above-referenced and co-owned applications, such as in US Published Patent Applications 2003/0034992, 2003/0103058, 2003/0085906, 2005/0225548 and 2005/0225563, some of which discuss subpixel rendering operations for RGBW displays. The majority white subpixel 315 may be rendered using a unity filter, while the paired red subpixel 310 and cyan subpixel 320 may use the filters described above in Matrices 1 and 2 for subpixel repeating group 230 of FIG. 2.

Figure 5:
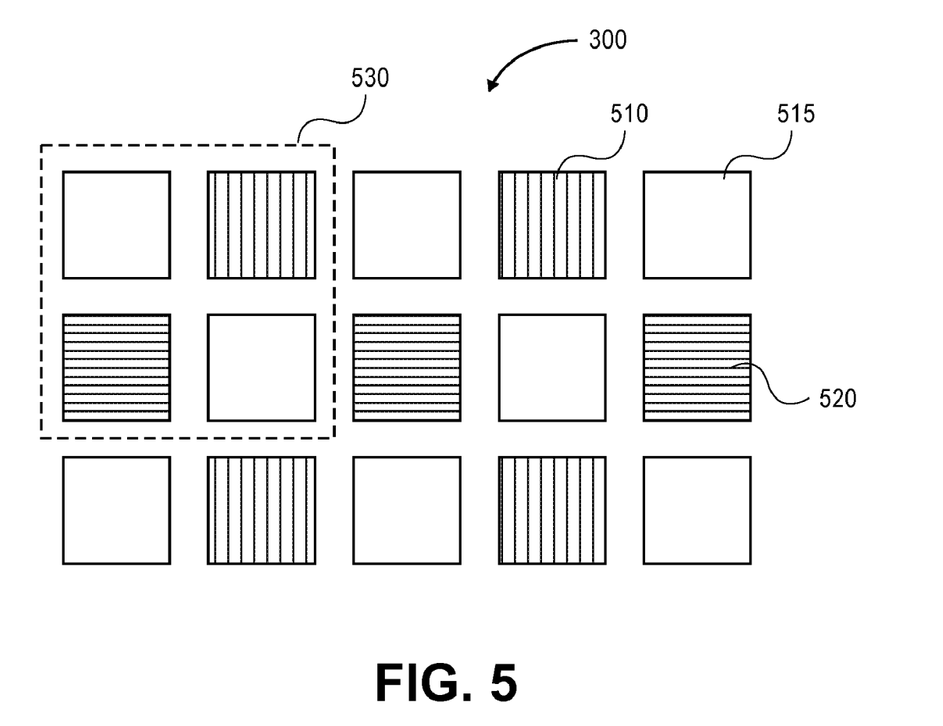
FIG. 5 shows a section of a display panel substantially comprising a four subpixel repeating group comprising three primary colors, in which each subpixel is substantially square.

FIG. 5 illustrates another example of a bichromatic display having a white primary. FIG. 5 shows a portion 500 of a display panel substantially comprising four subpixel repeating group 530 having red subpixels 510 and cyan subpixels 520 on a checkerboard with an additional white, or clear, subpixel 515 added in positions opposing the saturated primary subpixels. That is, the substantially metameric pair of subpixels may be placed on the interstitial or opposing positions of the white subpixels of a checkerboard arrangement. For subpixel rendering purposes, the white subpixel may use the filter described above in Matrices 1 and 2 for subpixel repeating group 230 of FIG. 2. Note that the subpixel rendering operation used in this embodiment may also employ the metameric filtering operations as taught in the Metamer Filtering application referenced above, since there exists a metameric degree of freedom between the white subpixel, W, and the metameric subpixel pair, RC, for white.

While the techniques and implementations have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. A display system for displaying a multi-color image in response to receipt of input color image data, the display system comprising:
   a spatial light modulator for displaying the multi-color image as its output; the spatial light modulator having a display area populated by pixel units, wherein each pixel unit is essentially comprised of a subpixel repeating group, the subpixel repeating group having individually addressable subpixels among which there are just two non-white primary color emitters having dominant emission peaks at respective first and second primary color wavelengths; the respective two primary colors emitted by the two primary color emitters defining respective primary color planes and also defining a substantially metameric pair of colors for white;
   a gamut mapping function module which produces in response to the received input color image data, an intermediate image data set including first data representing brightness levels of sample points in the first primary color plane of the spatial light modulator and brightness levels of sample points in the second primary color plane of the spatial light modulator; and
   a subpixel rendering module that performs area resampling operations on the intermediate image data set so as to produce resampled data points having implied positions corresponding to centers of spatial positionings in the spatial light modulator of the individually addressable subpixels.

2. The display system of claim 1 wherein the subpixel rendering module includes an area resampling filter structured to add to a weighted brightness contribution of a first sample point in one of the first and second primary color planes, weighted brightness contributions from neighboring sample points of the same-color plane.

3. The display system of claim 1 wherein:
   the gamut mapping function module causes the intermediate image data set to further include second data representing a luminance plane defined by luminance points represented by the input color image data; and
   the subpixel rendering module includes a Difference of Gaussians Wavelet filter structured to add to a weighted brightness contribution of a first sample point in one of the first and second primary color planes, weighted brightness contributions from neighboring sample points of the luminance plane.

4. The display system of claim 3 wherein:
   the subpixel rendering module includes an area resampling filter structured to add to a weighted brightness contribution of a first sample point in one of the first and second primary color planes, weighted brightness contributions from neighboring sample points of the same-color plane; and
   the subpixel rendering module uses a convolution of results from the area resampling filter and the Difference of Gaussians Wavelet filter.

5. The display system of claim 1 wherein the metameric pair of primary colors is selected from the group of pairs consisting of: orange and bluish-cyan, green and magenta, yellow and blue, violet and yellow-green and pink and pastel-cyan.

6. The display system of claim 1 wherein the two primary colors have substantially a same effective luminance when perceived through the human visual system.

7. The display system of claim 1 wherein subpixels of the two primary colors are denoted as $P_1$ and $P_2$ and said two non-white primary color emitters are arranged in a checkerboard pattern in a four subpixel repeating group such that there are two $P_1$ emitters diagonally opposed to each other in the checkerboard pattern and two $P_2$ emitters diagonally opposed to each other.

8. The display system of claim 1 wherein the subpixel repeating group further includes an individually addressable white subpixel.

9. The display system of claim 8 wherein subpixels of the two non-white primary colors, $P_1$ and $P_2$, are arranged in a checkerboard pattern together with a plurality of individually addressable white (W) subpixels in accordance with a four subpixel repeating group where the two white (W) subpixels oppose each other diagonally and the two non-white primary colors, $P_1$ and $P_2$, oppose each other diagonally.

10. The display system of claim 8 wherein subpixels of the two non-white primary colors, $P_1$ and $P_2$, are arranged in a checkerboard pattern together with a plurality of individually addressable white (W) subpixels in accordance with an eight subpixel repeating group denoted as

| $P_1$ | W | $P_2$ | W  |
|-------|---|-------|----|
| $P_2$ | W | $P_1$ | W. |

11. The display system of claim 1 wherein the input color image data is comprised of data values specified as two primary colors different from all primary colors of the subpixel repeating group, where the primary colors of the subpixel repeating group include a white primary color.

12. The display system of claim 1 wherein the input color image data is comprised of first and second image source data; the first image source data indicating achromatic image data, and the second image source data indicating monochromatic image data; the display system producing an output image having the monochromatic image data overlaid over the achromatic image data.

13. The display system of claim 12 wherein the second image source data indicating monochromatic image data is a chromatic representation of infrared image data.

14. The display system of claim 1 wherein the spatial light modulator is a liquid crystal display panel.

15. A display system for processing and displaying infrared input image data in combination with a second input color image data comprising:
   a first detector for detecting wavelengths of light in the infrared range from a scene to produce infrared input image data;

a second detector for detecting wavelengths of visible light from the scene to produce second input color image data;

an image combination module for combining the infrared input image data and the second input color image data into combined image data;

a spatial light modulator for displaying a multi-color image as its output; the spatial light modulator having a display area populated by pixel units, wherein each pixel unit is essentially comprised of a subpixel repeating group, the subpixel repeating group having individually addressable subpixels among which there are just two non-white primary color emitters having dominant emission peaks at respective first and second primary color wavelengths; the respective two primary colors emitted by the two primary color emitters defining respective primary color planes and also defining a substantially metameric pair of colors for white;

a gamut mapping function module which produces in response to the combined image data, an intermediate image data set including first data representing brightness levels of sample points in the first primary color plane of the spatial light modulator and brightness levels of sample points in the second primary color plane of the spatial light modulator; and a subpixel rendering module that performs area resampling operations on the intermediate image data set so as to produce resampled data points having implied positions corresponding to centers of spatial positionings in the spatial light modulator of the individually addressable subpixels.

16. The display system of claim 15 wherein the infrared input image data is represented as chromatic image data and the second input color image data is represented as luminance data in the combined image data.

17. The display system of claim 15 wherein the metameric pair of primary colors is selected from the group of pairs consisting of: orange and bluish-cyan, green and magenta, yellow and blue, violet and yellow-green and pink and pastel-cyan.

18. The display system of claim 15 wherein subpixels of the two primary colors, $P_1$ and $P_2$, are arranged to diagonally oppose one another in a checkerboard pattern.

19. The display system of claim 15 wherein the subpixel repeating group further includes a white subpixel.

* * * * *